United States Patent
Hureau et al.

(10) Patent No.: US 12,436,552 B2
(45) Date of Patent: Oct. 7, 2025

(54) VOLTAGE REGULATOR WHICH REDUNDANTLY MONITORS FOR AN OVER-VOLTAGE CONDITION BASED ON A REGULATED VOLTAGE PROVIDED TO A CONTROLLER AND METHODS

(71) Applicant: NXP USA, Inc., Austin, TX (US)

(72) Inventors: Loic Hureau, Toulouse (FR); Maxime Clairet, Labastidette (FR); Alaa Eldin Y El Sherif, Plano, TX (US); Jean-Philippe Meunier, Ayguesvives (FR); Thomas Henry Luedeke, Oberbergkirchen (DE)

(73) Assignee: NXP USA, Inc., Austin, TX (US)

( * ) Notice: Subject to any disclaimer, the term of this patent is extended or adjusted under 35 U.S.C. 154(b) by 397 days.

(21) Appl. No.: 18/062,646

(22) Filed: Dec. 7, 2022

(65) Prior Publication Data
US 2023/0185322 A1    Jun. 15, 2023

(30) Foreign Application Priority Data
Dec. 10, 2021 (EP) .................................. 21306736

(51) Int. Cl.
  *H02H 7/00* (2006.01)
  *G05F 1/571* (2006.01)
  *G06F 1/28* (2006.01)
  *H02M 3/158* (2006.01)

(52) U.S. Cl.
  CPC ............... *G05F 1/571* (2013.01); *G06F 1/28* (2013.01); *H02M 3/158* (2013.01)

(58) Field of Classification Search
  None
  See application file for complete search history.

(56) References Cited

U.S. PATENT DOCUMENTS

| | | | |
|---|---|---|---|
| 5,029,269 | A | 7/1991 | Elliott et al. |
| 5,697,870 | A | 12/1997 | Osborn |
| 5,850,156 | A | 12/1998 | Wittman |
| 7,514,911 | B2 | 4/2009 | Sutardja |
| 10,209,279 | B2 | 2/2019 | Tran et al. |

(Continued)

OTHER PUBLICATIONS

On Semiconductor, "High-Voltage Switcher for Low Power Offline SMPS", NCP1072, NCP 1075, Jan. 1, 2012, pp. 1-26, retrieved from the internet at http://www.farnell.com/datasheets/1651380.pdf on Jan. 11. 2018.

(Continued)

*Primary Examiner* — Stephen W Jackson

(57) ABSTRACT

Monitoring for an over-voltage condition based on a regulated voltage is disclosed. A first terminal of a voltage regulator receives a first voltage which is based on a regulated voltage input to a controller. A second terminal of the voltage regulator receives a second voltage indicative of the voltage input to the controller. A determination is made whether the first voltage exceeds the first voltage reference for a first time window and the controller is reset based on the determination that the first voltage exceeds the first voltage reference. A determination is also made whether the second voltage exceeds the second voltage reference for the second time window and the voltage regulator is powered down on based on the determination that the second voltage exceeds the second voltage reference.

18 Claims, 6 Drawing Sheets

(56) References Cited

U.S. PATENT DOCUMENTS

| | | |
|---|---|---|
| 10,474,846 B1 | 11/2019 | Rezayee et al. |
| 10,481,626 B1 | 11/2019 | Tang et al. |
| 2015/0109835 A1* | 4/2015 | Xu .................... H02H 7/1213 |
| | | 363/50 |
| 2019/0265769 A1 | 8/2019 | Gelman et al. |

OTHER PUBLICATIONS

"IEEE Recommended Practice for Electronic Power Subsystems: Parameter Definitions, Test Conditions, and Test Methods", IEEE Std 1515TM-2000 (2008), Mar. 30, 2000, pp. 1-83 IEEE-SA Standards Board, IEEE, Piscataway, NJ, USA.

* cited by examiner

VOLTAGE REGULATOR WHICH REDUNDANTLY MONITORS FOR AN OVER-VOLTAGE CONDITION BASED ON A REGULATED VOLTAGE PROVIDED TO A CONTROLLER AND METHODS

FIELD OF USE

This disclosure generally relates to a voltage regulator which provides a regulated voltage to a controller, and more particularly to redundantly monitoring for an over-voltage condition based on the regulated voltage.

BACKGROUND

A voltage regulator outputs a regulated output voltage such as Vdd on a power rail to power a controller. The voltage output by the voltage regulator is regulated based on a sense voltage output by a sense terminal of the controller received at a feedback terminal of the voltage regulator. During operation, an error between a reference voltage and the sense voltage is compared and the error is reduced by adjusting the regulated output voltage in a control loop. For a switch mode power supply (SMPS), if the sense voltage increases from the reference voltage, then the voltage regulator reduces a pulse width modulation (PWM) duty cycle to decrease the regulated output voltage. If the sense voltage decreases from the reference voltage, then the voltage regulator increases the PWM duty cycle to increase the regulated output voltage. The sense voltage is also used to monitor an under-voltage condition and an over-voltage condition in the controller.

Figure 1:
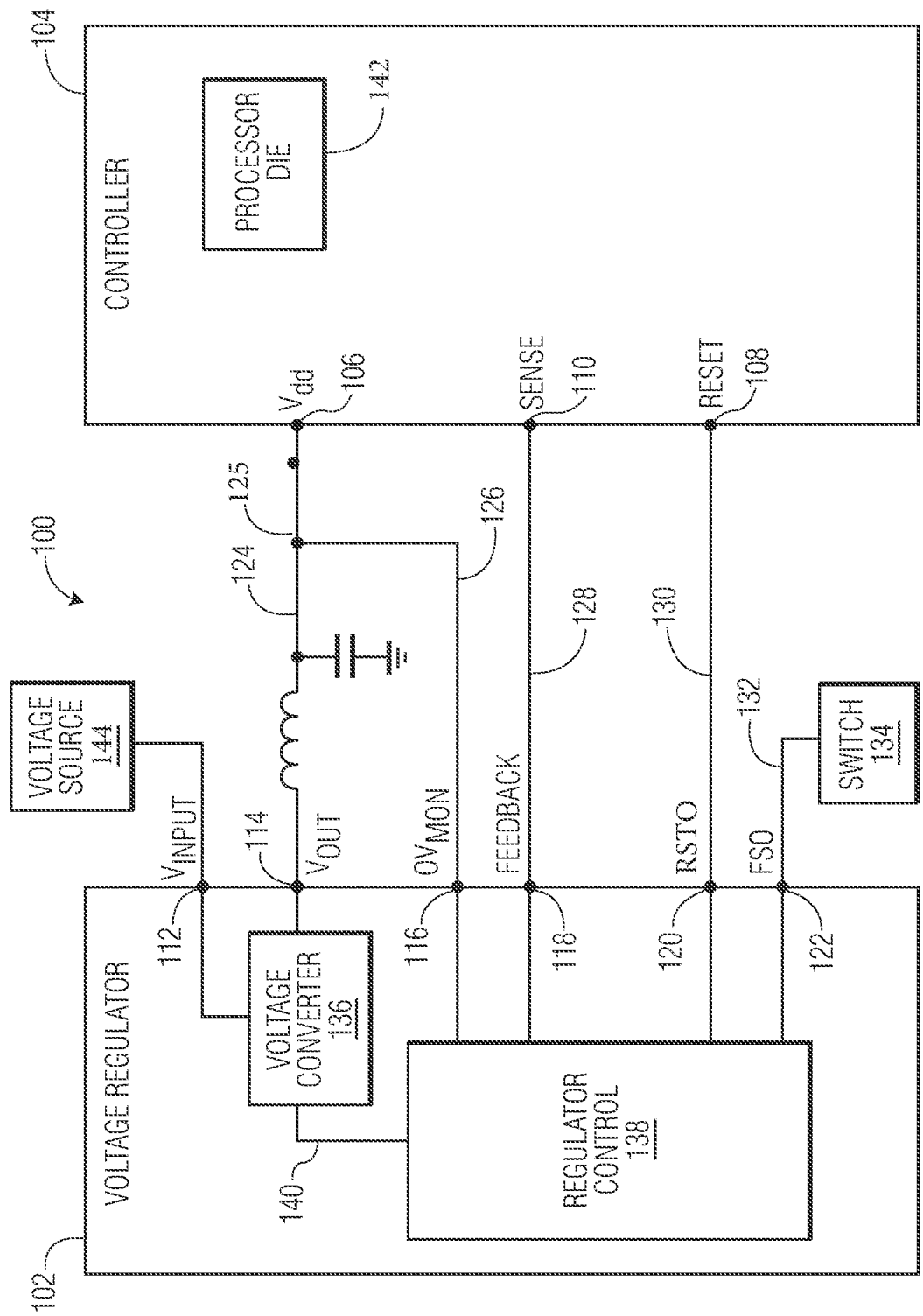
FIG. 1 is a block diagram of an example power control system which includes an example voltage regulator and an example controller in accordance with an embodiment.

The drawings are for the purpose of illustrating example embodiments, but it is understood that the embodiments are not limited to the arrangements and instrumentality shown in the drawings.

DETAILED DESCRIPTION

A voltage regulator is powered down to protect a controller from damage when a sense voltage from the controller received at the voltage regulator exceeds a maximum operating voltage. An over-voltage condition where the voltage regulator exceeds the maximum operating is referred to as operating over-voltage condition. Further, a controller is reset when the sense voltage from the controller exceeds the maximum operating voltage associated with the operating over-voltage condition or the sense voltage from the controller is below a minimum operating voltage associated with an under-voltage condition to prevent unreliable operation of the controller. A sense voltage is output by a sense terminal on the controller and the voltage regulator receives the sense voltage at a feedback terminal on the voltage regulator via a connection between the sense terminal and the feedback terminal. The feedback terminal is coupled to a pull-down resistor divider circuit in the voltage regulator, and circuitry also in the voltage regulator regulates the regulated output voltage based on the sense voltage. In the event the connection between the sense terminal and feedback terminal is disconnected, a wirebond or trace breaks in the controller, or circuit malfunctions in the controller such that the sense terminal does not provide the sense voltage, the voltage at the feedback terminal would decay based on action of the pull-down resistor divider circuit. The decaying voltage causes the voltage regulator to increase the regulated output voltage to an absolute maximum voltage higher than the maximum operating voltage which results the controller being damaged. An over-voltage condition where the regulated output voltage is higher than the absolute maximum voltage is referred to as an absolute maximum over-voltage condition.

Embodiments disclosed herein are directed to a voltage regulator which has a separate over-voltage monitoring terminal from the feedback terminal to detect the over-voltage condition referred to as an absolute maximum over-voltage condition. The over-voltage monitoring terminal is coupled to a connection between the regulator output terminal of the voltage regulator and a voltage input terminal of the controller. In the event that the connection between the sense terminal and feedback terminal is disconnected (e.g., is an open circuit), a wirebond or trace breaks in the controller, or circuit malfunctions in the controller such that the sense terminal does not provide the sense voltage, circuitry of the voltage regulator coupled to the over-voltage monitoring terminal will be able to still monitor the regulated output voltage. In the event that the monitored voltage exceeds the absolute maximum voltage for a period of time, the absolute maximum over-voltage condition is detected and the voltage regulator is powered down to prevent damage to the controller. Well known instructions, protocols, structures, and techniques have not been shown in detail in order not to obfuscate the description.

FIG. 1 is a block diagram of an example power control system 100 which includes an example voltage regulator 102 and an example controller 104 in accordance with an embodiment. In examples, the voltage regulator 102 may output a regulated voltage to the controller 104 which is a microcontroller unit (MCU) or processor and power the controller 104. The voltage regulator 102 and the controller 104 may be each implemented using circuitry such as analog circuitry, mix signal circuitry, memory circuitry, logic circuitry, processing circuitry arranged to execute code stored in a memory and when executed by the processing circuitry perform the disclosed functions, and/or combinations thereof. Further, the voltage regulator 102 and the controller 104 may be each formed in a semiconductor package comprising one or more semiconductor dies.

The semiconductor package of the controller 104 may have a processor die 142 and a plurality of terminals (e.g., "pins" of the semiconductor package). In an example, the processor die 142 may include circuitry associated with a microprocessor. The terminals may be coupled to the processor die 142 by a respective trace (not shown) or wirebond (not shown) in the controller 104 to the processor die 142. In an example, the terminals may include a voltage input terminal 106, a reset terminal 108, and a sense terminal 110. The voltage input terminal 106 may receive a regulated voltage which powers the controller 104. The reset terminal 108 may receive a signal to reset the controller 104. Upon detection of the signal at the reset terminal 108, the controller 104 may power down and then power up (i.e., reset) to reset the controller 104 to default settings. The sense terminal 110 may output a voltage of the controller 104 based on the regulated voltage applied at the voltage input terminal 106 referred to as a sense voltage. The sense voltage may be a voltage measured at one or more of a voltage input to a processor die 142 of the controller 104, at a terminal of the controller 104, or another circuit in the controller 104 based on the regulated voltage applied at the voltage input terminal 106. In the event the sense voltage is measured at the processor die 142, the sense voltage may account for any losses of the regulated voltage over a trace or wirebond in the controller 104 to the processor die 142 where the sense voltage is measured. In the event the sense voltage is measured at the terminal of the controller 104 or another circuit in the controller 104, the sense voltage may account for any losses of the regulated voltage to the terminal of the controller 104 or another circuit in the controller 104 where the sense voltage is measured. Further, in an example, the sense terminal 110 may not output any current to a load connected to the sense terminal 110. The controller 104 may have fewer or more terminals.

The semiconductor package of the voltage regulator 102 also has a plurality of terminals. In an example, the plurality of terminals includes a voltage input terminal 112, a pulse width modulated (PWM) output terminal 124, the over-voltage monitoring terminal 116, a feedback terminal 118, a controller reset output (RSTO) terminal 120, and a failsafe output (FSO) terminal 122. The voltage input terminal 112 may receive an unregulated input voltage to power the voltage regulator 102 from a voltage source 144. The voltage output terminal 114 may output a PWM voltage based on the unregulated input voltage. The over-voltage monitoring terminal 116 may receive a voltage which is used to determine whether to power down the voltage regulator 102. The feedback terminal 118 may receive a voltage which is used to regulate a regulated voltage based on the PWM voltage. The reset output terminal 120 may output a signal to indicate reset to another circuit such as the controller 104 as described in more detail below. The failsafe output terminal 122 may output a signal to a safety related device 134 such as a switch which may place a system operated by the controller 104 in a safe state as described also in more detail below, a transceiver such as an Ethernet transceiver, or controller area network (CAN) transceiver. The voltage regulator 102 may have fewer or more terminals.

In an example, one or more terminals of the voltage regulator 102 and the controller 104 are coupled together by a respective connection such as a conductive trace on a printed circuit board (PCB) or a conductive wire. For instance, a connection 124 may connect the PWM voltage output terminal 114 of the voltage regulator 102 and the voltage input terminal 106 of the controller 104. The connection 124 may include an inductor and capacitor which acts as a filter to the PWM voltage output by the voltage output terminal 114 to form a regulated output voltage at regulated voltage output node 125. Further, a connection 126 may connect the over-voltage monitoring terminal 116 to the node 125. Still further, a connection 128 may connect the feedback terminal 118 of the regulator 102 to the sense terminal 110 of the controller 104. Further, a connection 130 may connect the reset terminal 120 of the voltage regulator 102 with a reset terminal 108 of the controller 104. Still further, a connection 132 may connect the failsafe output terminal 122 of the voltage regulator 102 to the safety related device 134.

In operation, a voltage converter 136 of the voltage regulator 102 may receive an unregulated voltage input at the voltage input terminal 112 of the voltage regulator 102 and output the PWM voltage at the voltage output terminal 114 based on the unregulated voltage input which is converted to the regulated output voltage at node 125. The voltage converter 136 in the example power control system 100 as shown may be a switch mode power supply (SMPS) such as a buck converter which receives the unregulated voltage input at the voltage input terminal 112 such as a 5 volts and outputs the PWM voltage at the voltage output terminal 114 which is then filtered by the inductor and capacitor to provide a regulated output voltage at node 125 of 0.8 volts.

In an example, the input voltage at the voltage input terminal 106 may be the regulated output voltage at node 125 including any losses associated with connection 126. In an example, the voltage converter 136 may take the form of a linear regulator which directly outputs a regulated voltage at the voltage output terminal 114 instead of the SMPS. In this example, no components, components in addition to, or components instead of the inductor or capacitor may be in between the voltage output terminal 114 and the voltage input terminal 106.

A regulator control 138 may control operation of the voltage converter 136 including the regulated output voltage of the voltage converter 136. The regulator control 138 may be based on one or more of the voltage at the over-voltage monitoring terminal 116 and the voltage at the feedback terminal 118. The voltage at the over-voltage monitoring terminal 116 may be indicative of the regulated output voltage at node 125. The voltage at the feedback terminal 118 may be indicative of the sense voltage at the sense terminal 110 which is then provided to the feedback terminal 110 of the voltage regulator 102 via the connection 128. The voltage regulator 102 may receive the sense voltage at the feedback terminal 118 and the regulator control 138 may provide a signal to the voltage converter 136 via connection 140 to minimize a difference between the sense voltage and a reference voltage. In the event that the voltage converter 136 is a buck converter, the signal may control switching of transistors of the buck converter to produce the PWM voltage and minimize a difference between the sense voltage and the reference voltage.

The regulator control 138 may also control the operation of the controller 104 so that the controller operates 104 based on the sense voltage being between an operating minimum voltage and an operating maximum voltage. The operating minimum voltage is a voltage which is a minimum voltage that the controller should receive to insure reliable operation. Similarly, the operating maximum voltage is a voltage which is a maximum voltage that the controller should receive to insure reliable operation. Neither voltages would result in damage to the controller. The sense voltage may be ideally targeted to be 0.8 volts in an example. In the event that the sense voltage falls below the operating minimum voltage (an operating under-voltage condition) voltage such as 0.77 volts, the voltage regulator 102 may output a signal to the reset terminal 120 which causes the controller 104 to reset. In the event that the sense voltage exceeds an operating maximum voltage (an operating over-voltage condition) such as 0.83 volts, the voltage regulator 102 may also output a signal to the reset terminal 122 which causes the controller to reset. In some examples, the voltage regulator 102 may also be cycled off and/or on. By monitoring the sense voltage with respect to the operating minimum voltage and operating maximum voltage, the controller 104 is able to operate under optimum power conditions.

In some examples, a connection between the feedback terminal 118 of the voltage regulator 102 and the sense terminal 110 of the controller 104 may be disconnected (e.g., be an open circuit). For example, the connection 128 may break or one or more of the feedback terminal 118 and sense terminal 110 may be de-soldered from the connection 128. In some examples, a wirebond or trace breaks in the controller 104 or circuit malfunctions in the controller 104 such that the sense terminal 110 does not receive the sense voltage. As a result, no voltage or voltage not indicative of the sense voltage may be applied to the feedback terminal 118 in the example which results in the regulator control 138 signaling the voltage converter 136 to increase the PWM duty cycle of the PWM voltage output in an attempt to reduce an error between the voltage at the feedback terminal 118 and a reference voltage. As the voltage output terminal 114 outputs the PWM voltage output and the regulated output voltage is provided to the voltage input terminal 106 of the controller 104, the regulated voltage output may exceed an absolute maximum voltage higher than the operating maximum voltage such as 0.86 volts and damage the controller 104. The absolute maximum voltage is indicative of a voltage which when applied to the voltage input terminal 106 could damage the controller 104. The regulated voltage output exceeding the absolute maximum voltage is an over-voltage condition referred to as absolute maximum over-voltage condition in an example.

In examples, a connection 126 connects the over-voltage monitoring terminal 116 to the connection 124 between the voltage output terminal 114 of the voltage regulator 102 and the voltage input terminal 106 of the controller 104. The over-voltage monitoring terminal 116 provides an indication of the voltage of the connection 124. In the event the connection 128 between the feedback terminal 118 and the sense terminal 110 is disconnected, the voltage at the feedback terminal 118 decays. To prevent the voltage regulator 102 from increasing the regulated output voltage beyond the absolute maximum voltage which would damage the controller 104, the regulator control 138 would receive a voltage at the over-voltage monitoring terminal 116. The regulator control 138 may detect that the voltage at the over-voltage monitoring terminal 116 which is indicative of the regulated voltage input at the voltage input terminal 106 is above the absolute maximum voltage. The regulator control 138 may shut the voltage regulator 102 down so that controller 104 is not damaged. In some examples, the voltage regulator 102 may also output a signal to failsafe output terminal 122 to activate the safety related device 134 which in an example may be a switch that disables a system coupled to the controller 104 placing the coupled system in a safe state. Examples of such a system which is disabled may include a motor, a communication bus, an actuator, or an inverter which is controlled by the controller 104. The voltage regulator 102 is able to be reliably powered down when the connection 128 between the feedback terminal 118 and the sense terminal 110 is disconnected or the sense terminal 110 does not receive the voltage measured at the processor die 142.

Figure 2:
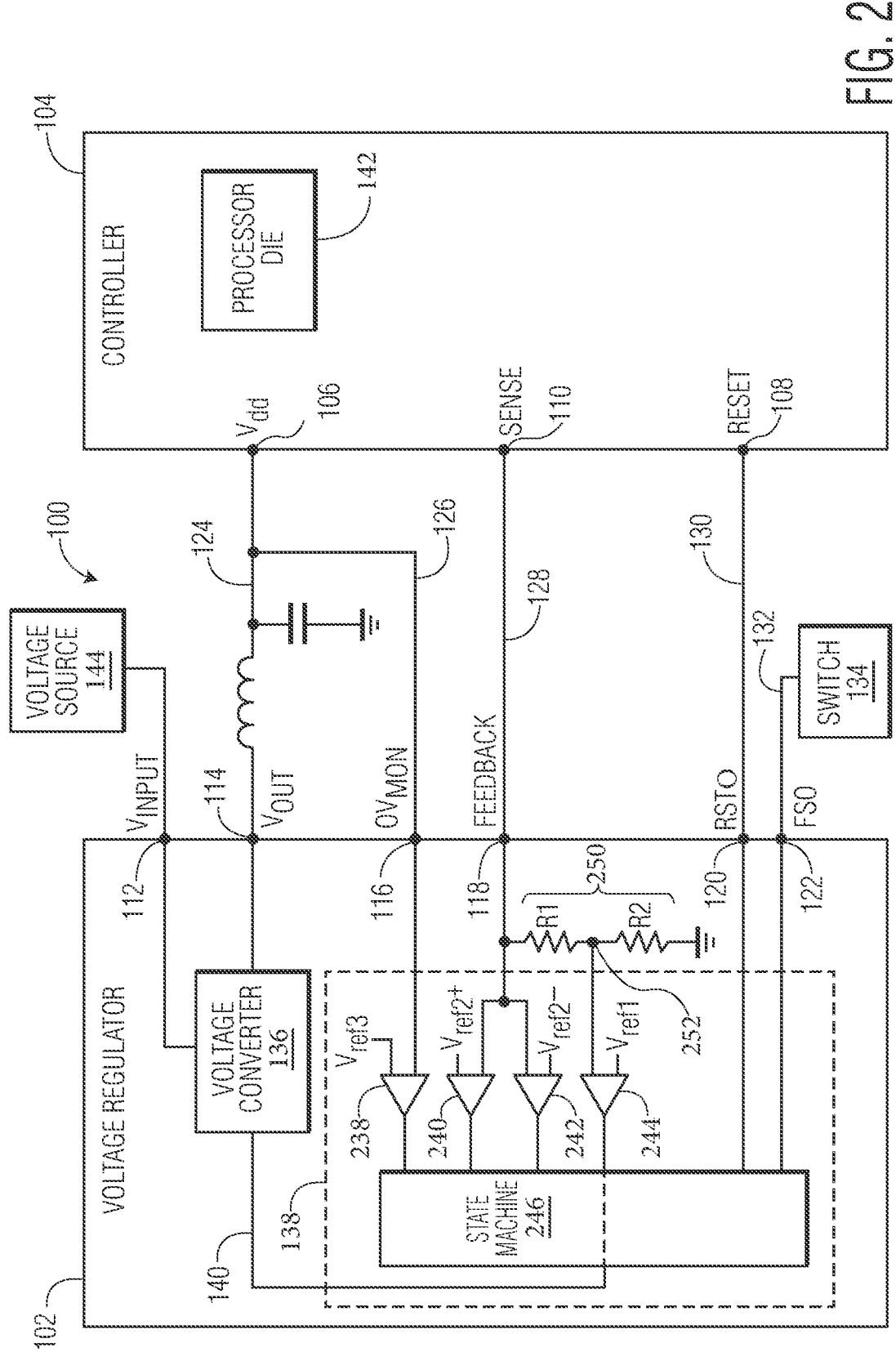
FIG. 2 is a block diagram of the example voltage regulator and the example controller in more detail in accordance with an embodiment.

FIG. 2 is a block diagram of the example power control system 100 which includes the voltage regulator 102 and the example controller 104 in more detail in accordance with an embodiment. In an example, the regulator control 138 includes a plurality of comparators 238-244 and a state machine 246 each implemented using circuitry such as analog circuitry, mix signal circuitry, memory circuitry, logic circuitry, processing circuitry arranged to execute code stored in a memory and when executed by the processing circuitry perform the disclosed functions, and/or combinations thereof.

The error amplifier 244 may control operation of the voltage converter 136 and the regulated output voltage. A pull-down resistor divider 250 may be coupled to the feedback terminal 118 and receive the sense voltage. The pull-down resistor divider 250 may have two resistors R1, R2 separated by a node 252 where R2 is coupled to ground. In an example, the resistors of the pull-down resistor divider 250 may be configurable. The error amplifier 244 may compare a voltage at the node 252 of the resistor divider 250 with a reference voltage Vref1 and output an error which is provided to the voltage converter 136 by a connection 140 between the voltage converter 136 and the error amplifier 244. The Vref1 may be a proportion of a desired regulated output voltage. The resistor divider 250 may be configured to proportionally reduce the sense voltage so that when the Vref1 is the same as the voltage at the node 252, the voltage regulator 102 is outputting a desired regulated voltage. The error may be provided to the voltage converter 136 which controls the regulated output voltage to reduce the error. For an SMPS, if the regulator output voltage is to increase, then the voltage regulator reduces a PWM duty cycle to decrease the regulator output voltage. For an SMPS, if the regulator output voltage is to decrease, then the voltage regulator increases the PWM duty cycle to increase the regulator output voltage. In an example, the regulation may take place cycle-by-cycle.

In conjunction with outputting the regulated output voltage based on the error, the regulator control 138 may detect whether the regulated output voltage is below a minimum operating voltage or above a maximum operating voltage. The comparator 240 may compare the sense voltage to a maximum operating voltage reference and output a difference to the state machine 246. Similarly, the comparator 242 may compare the sense voltage to a minimum operating voltage reference and output a difference to the state machine 246. In an example, the maximum operating voltage reference may be Vref2+ and the minimum operating voltage reference may be Vref2−. Vref2+ may be a desired regulated voltage increased by a certain percentage from a desired regulated voltage (e.g., 0.8 volts) such as +4% or 0.83 volts. Vref2− may be a desired regulated voltage (e.g., 0.8 volts) decreased by a certain percentage from the desired regulated voltage such as −4% or 0.77 volts. In the event the sense voltage is greater than the maximum operating voltage reference indicated by the comparator 240, the comparator 240 may provide an indication. The state machine 246 may comprises logic to perform an action based on the indication of the comparator 240. The action may be to identify an operating over-voltage condition which causes a signal to be provided to the reset terminal 120 to reset the controller 104 so that operation of the controller 104 is not compromised by the operating over-voltage condition. Additionally, or alternatively, the voltage regulator 102 may be powered down. In the event that the sense voltage is less than the minimum operating voltage reference indicated by the comparator 242, the comparator 242 may provide an indication. The state machine 246 may comprises logic to perform an action based on the indication of the comparator 242. The action may be to identify an operating under-voltage condition which causes a signal to be provided to the controller 104 to reset the controller 104 so that operation of the controller 104 is not compromised by the operating under-voltage condition.

The comparator 238 may also be used to detect that the voltage at the over-voltage monitoring terminal 116 is greater than an absolute maximum voltage. In an example the absolute maximum voltage may be Vref3 which is may be greater than Vref 2+. In an example, Vref3 may be a desired regulated voltage increased by a certain percentage from the desired regulated voltage such as +8% or 0.86 volts. This Vref may correlate to a maximum voltage input rating for the controller 104. In the event that the connection 128 between the feedback terminal 118 and the sense terminal 110 is disconnected, a wirebond or trace breaks in the controller 104, or circuit malfunctions in the controller 104 such that the sense terminal 110 does not receive the sense voltage, the sense voltage decays. An error between the sense voltage and reference voltage Vref2 as the sense voltage decays may increase based on the output of the comparator 242 causing an indication of an increasing error to be provided to voltage converter 136 which increases the regulated voltage output in an attempt to reduce the error. The regulated output voltage may increase to as high as the voltage of the unregulated voltage input at the voltage input terminal 112 and potentially damage the controller 104 which is connected to the voltage output terminal 114. The over-voltage monitoring terminal 116 may be coupled to the connection 124 and receive an indication of the regulated voltage input at the voltage input terminal 106. In the event that the voltage at the over-voltage monitoring terminal 116 is above the absolute maximum voltage Vref3, the voltage could damage the controller 104. The comparator 238 may output an indication to the state machine 246. The state machine 246 may comprises logic to perform an action based on the indication of the comparator 238. The action may be to identify the absolute maximum over-voltage condition which causes the voltage regulator 102 to be powered down. The voltage regulator 102 may also provide a signal to the failsafe output terminal 132 to activate the safety related device 134 to place the system controlled by the controller 104 in a "safe mode." In the event that the voltage at the over-voltage monitoring terminal 116 is not above the absolute maximum voltage Vref3, the comparator 238 does not output the indication and the voltage regulator 102 may not be powered down.

FIG. 1 illustrates use of the resistor divider 250 to adjust a sense voltage input to the comparator 244. In other examples, a respective resistor divider may be coupled to each of the inputs to the comparator 240 and comparator 238 to adjust the sense voltage and voltage received at the over-voltage monitoring terminal 116 respectively. The input of the comparator 240 which is coupled to the feedback terminal 118 may be coupled to a node between resistors of a resistor divider. Similarly, input of the comparator 238 which is coupled to the over-voltage monitoring terminal 116 may be coupled to a node between resistors of a resistor divider. The respective resistor dividers may allow for a respective voltage reference associated with each comparator to output a voltage proportional to the minimum operating voltage reference, maximum operating voltage reference, or absolute maximum voltage reference. When the voltage at a node of the resistor divider associated with comparator 242 is the same as the voltage proportional to the minimum operating voltage reference, then an under-voltage condition is reached. When the voltage at a node of the resistor divider associated with comparator 240 is the same as the voltage proportional to the maximum operating voltage reference, then an operating over-voltage condition is reached. When the voltage at a node of the resistor divider associated with comparator 238 is the same as the voltage proportional to the absolute maximum voltage reference, then an absolute maximum over-voltage condition is reached.

In an example, the state machine 246 may apply a windowing process to determine whether an over-voltage or under-voltage condition occurs. The windowing process evaluates whether a voltage such as the sense voltage or the voltage at the over-voltage monitoring terminal 116 exceeds a respective reference voltage for a period of time. The windowing process prevents transient voltages associated with when the controller 104 draws more voltage for a short period of time due to increased processing load or electromagnetic noise from causing the voltage regulator 102 to switch off or reset the controller 104.

Figure 3:
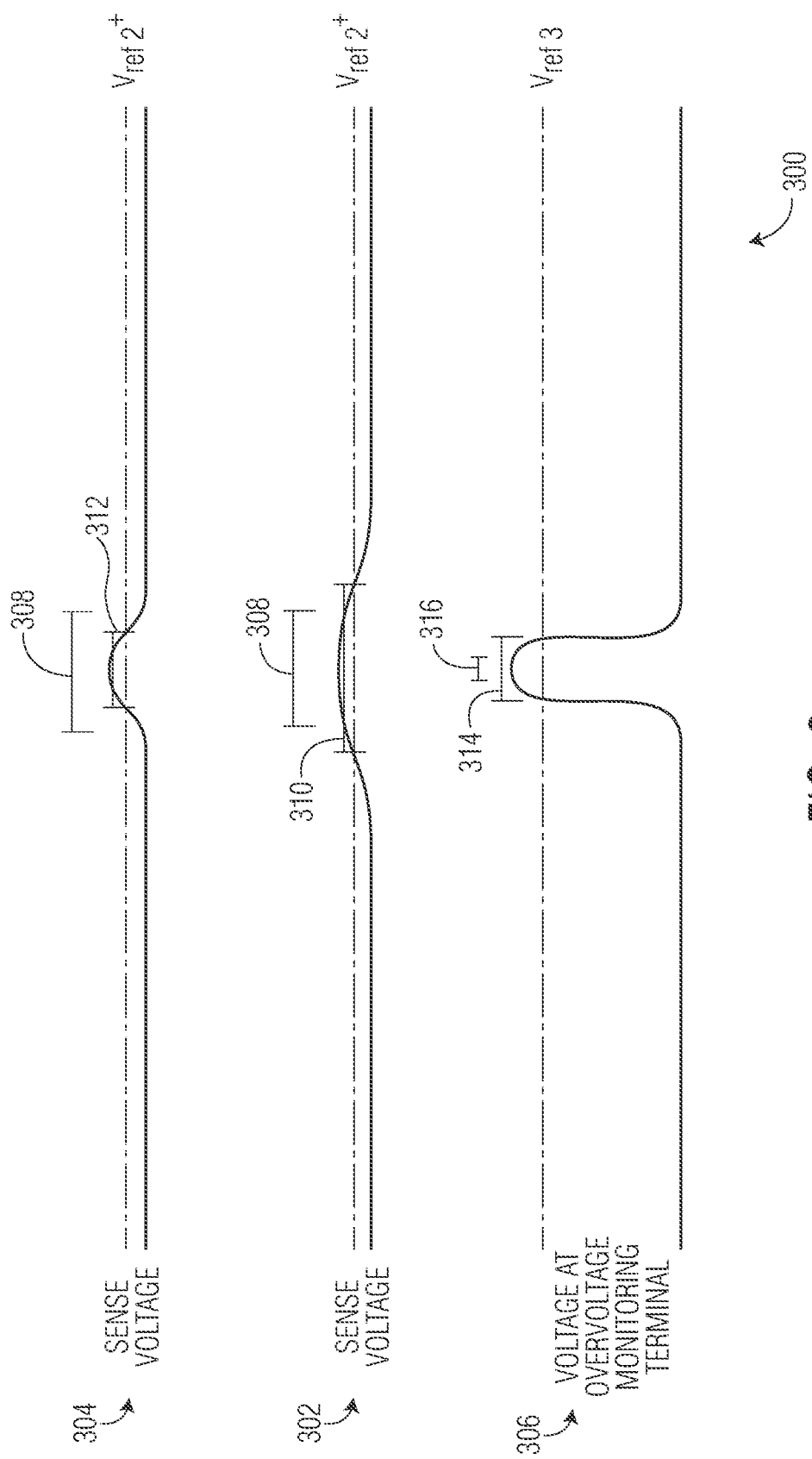
FIG. 3 illustrates examples windowing process to determine an operating over-voltage or operating under-voltage condition in accordance with an embodiment.

FIG. 3 illustrates example windowing processes 300 to determine an over-voltage or under-voltage condition in accordance with an embodiment. In one example, the comparator 240 may compare a sense voltage 302 to a reference voltage Vref2+. Further, the sense voltage 302 may be compared with the reference voltage for a window of time 308 which is a wide windowing time such as 50 microseconds (us). The wide windowing time prevents short transients in voltage exceeding the Vref2+ from triggering an operating over-voltage condition. Short transients may be due to increased processing load on the controller 104 or electromagnetic noise and not an error condition. When the sense voltage 302 exceeds Vref2+ as shown by range 310 beyond the window time 308, the state machine 146 causes the controller 104 to be reset because an operating over-voltage condition is detected. The state machine may 246 may cause the reset terminal 120 to send a signal to reset the controller 104. In another example, the comparator 240 may also compare a sense voltage 304 to a reference voltage Vref2+. Further, the sense voltage 304 may be compared with the reference voltage for the window of time 308. When the sense voltage 304 exceeds Vref2+ as shown by range 312 but not beyond the window of time 308, the state machine 246 does not cause the controller 104 to be reset because an operating over-voltage condition is not detected.

Similar processing may be performed to detect an operating under-voltage condition based on comparing the sense voltage to the Vref2− using the comparator 242 and comparing the sense voltage with the reference voltage for a window of time. The state machine 246 may cause the reset terminal 120 to send a signal to reset the controller 104 if the operating under-voltage condition is detected. In some examples, the controller 104 may not be reset when the operating under-voltage condition is detected. Instead a determination may be made if the controller 104 is operating properly. The controller 104 may have circuitry to indicate whether the controller 104 is operating properly such as a watchdog (not shown) which is a circuit that periodically sends a message to the controller 104. So long as the controller 104 responds to the message the controller 104 is deemed to be operating properly. In the event that the operation of the controller 106 is proper, the controller 104 is not reset. In the event that the operation of the controller 106 is not proper, the controller 106 is reset.

In the event that the connection 128 between the feedback terminal 118 and the sense terminal 110 is disconnected, a wirebond or trace breaks in the controller 104, or circuit malfunctions in the controller 104 such that the sense terminal 110 does not receive the sense voltage, the voltage regulator 102 may increase the regulator output voltage such that a voltage at the over-voltage monitoring terminal 116 exceeds the reference voltage Vref3 which is higher than Vref2. Alternatively, the voltage regulator 102 may increase the regulator output voltage such that the voltage at the over-voltage monitoring terminal 116 exceeds the reference voltage Vref3 which is higher than Vref2 during a high processing load period by the controller 104 which demands additional current and voltage but which is shorter than the wide windowing time. The comparator 238 may compare the voltage 306 at the over-voltage monitoring terminal 116 to the reference voltage Vref3. Further, the voltage 306 at the over-voltage monitoring terminal 116 may be compared with the Vref3 for a window of time 316 which is a narrow window such as 1 to 4 microseconds (μs). In the event that the voltage 306 at the over-voltage monitoring terminal 116 exceeds Vref3 as shown by range 314 beyond the narrow window time 316, the absolute maximum over-voltage condition is detected. The state machine 246 may cause the voltage regulator 102 to be powered down to avoid the regulated output voltage from damaging the controller 104. The state machine 246 may cause the failsafe output terminal 132 to send a signal to the safety related device 134.

In an example, Vref 2 may be lower than Vref 3. For example, Vref2 may be 4% of the target regulated output voltage and Vref3 may be 8% of the target regulated output voltage. The voltages of the Vref2 and Vref3 thresholds and duration of the windows of time are given as examples. Both the reference voltages and the durations of the windows of time are programmable to match the requirements of different process technology in implementing the controller 104. In some examples, the voltage regulator 102 may be powered down and then powered on (i.e., reset) when the absolute maximum over-voltage condition or operating over-voltage condition are detected. The windowing process may then be applied to voltages at the terminals 116, 118 as described above when the voltage regulator 102 is powered up.

Further, a number of times the voltage regulator 102 is reset when the absolute maximum over-voltage condition is detected may be counted and stored in a memory of the voltage regulator 102 for predictive reliability data of the voltage regulator 102. After a certain number of times the voltage 306 at the over-voltage monitoring terminal 116 exceeds the Vref3 for the window of time 316, the voltage regulator 102 will be powered down indefinitely until a problem with the voltage regulator 102 can be diagnosed.

Table 1 below is an example summary of actions described above taken as a result the sense voltage or voltage at the over-voltage monitoring terminal exceeding a respective reference voltage (in an operating over-voltage condition "OVmon1" or absolute maximum over-voltage condition "OVmon2") or the sense voltage not exceeding a respective reference voltage (in an under-voltage condition "UV") for a respective window of time. In case of a UV condition, the controller 104 may be reset or no action may be taken because the controller 104 is operating properly. In an OVmon1 condition, the controller 104 may be reset as described above but in some examples, the voltage regulator 102 may be also powered down or reset. In an OVmon2 condition, the controller 104 may be reset and the voltage regulator 102 may be powered down or reset. Additionally, the number of times the voltage regulator 102 is reset may be counted as described above.

TABLE 1

| # | Detection | Action | RSTO assertion | FS0 assertion |
|---|---|---|---|---|
| 1 | UV | No action or voltage controller reset only | No by default (configurable) | Yes by default (configurable) |
| 2 | OVmon1 | Voltage controller reset only, Voltage controller and Regulator reset, and/or Regulator OFF | Yes by default (configurable) | Yes by default (configurable) |
| 3 | OVmon2 | Voltage controller reset and Regulator reset, and/or Regulator OFF (limit the cycling effect in case of reset) | Yes by default (configurable) | Yes by default (configurable) |

The voltage regulator or the controller may take other forms. In other examples, the voltage regulator or the controller may have different terminals or components to perform detection of an operating over-voltage condition, an operating under-voltage condition, or a failsafe over-voltage condition that may damage the controller.

Figure 4:
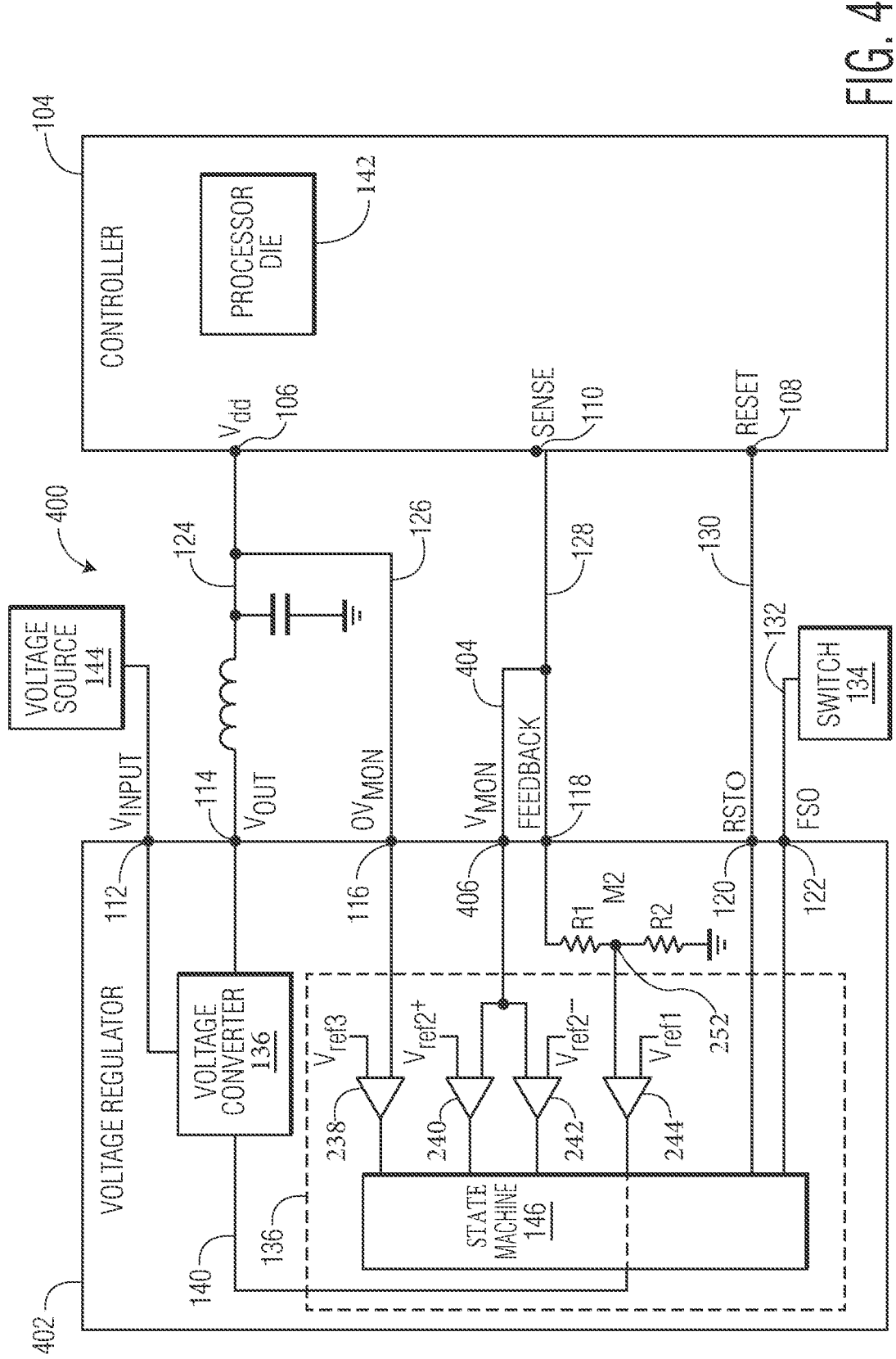
FIG. 4 is a block diagram of another example power control having an example voltage regulator and an example controller in accordance with an embodiment.

FIG. 4 is a block diagram of an example power control system 400 which includes an example voltage regulator 402 and an example controller 104 in accordance with an embodiment. Reference numbers may correspond to components described with respect to the voltage regulator 102 and controller 104 and are not described again for conciseness. The voltage regulator 402 may further have a voltage monitoring terminal 406 which receives the sense voltage which is input to the comparators 240, 242 via a connection 404 to compare with a respective reference voltage to detect an operating under-voltage condition or operating over-voltage condition rather than the sense voltage on the feedback terminal 118 being coupled to the comparators 240, 242. The voltage monitoring terminal 404 may provide an indication of the sense voltage even if the feedback terminal 118 is de-soldered from the connection 128 so that the operating over-voltage condition and failsafe over-voltage condition would be detected and the voltage regulator 102 is shut down.

Figure 5:
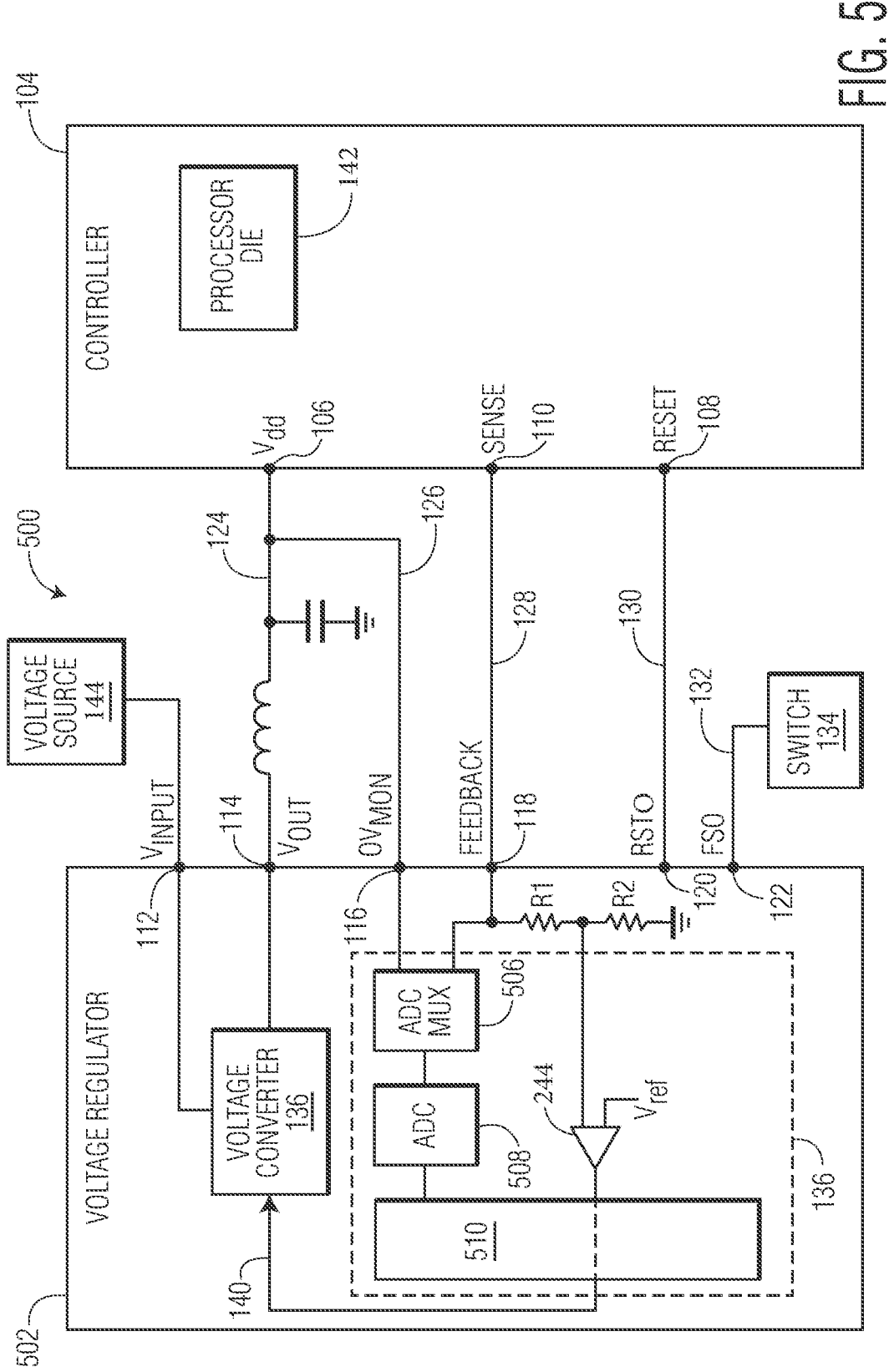
FIG. 5 is a block diagram of yet another example power control having an example voltage regulator and an example controller in accordance with an embodiment.

FIG. 5 is a block diagram of an example power control system 500 which includes an example voltage regulator 502 and an example controller 104 in accordance with an embodiment. Reference numbers may correspond to components described with respect to the voltage regulator 102 and controller 104 and are not described again for conciseness. The voltage regulator 502 may have a multiplexer 506 which receives one or more of the sense voltage and the voltage at the over-voltage monitoring terminal 116. The multiplexer 506 may select one of the sense voltage and voltage at the over-voltage monitoring terminal 116 which is provided to an analog-to-digital converter 508 which converts the provided voltage to a digital signal. A state machine 510 may perform the windowing process based on the output of the analog-to-digital converter 508 in a digital domain and cause the voltage regulator 502 to perform an action such reset the controller 504 or shut down the voltage regulator 502 based on the windowing described above.

Figure 6:
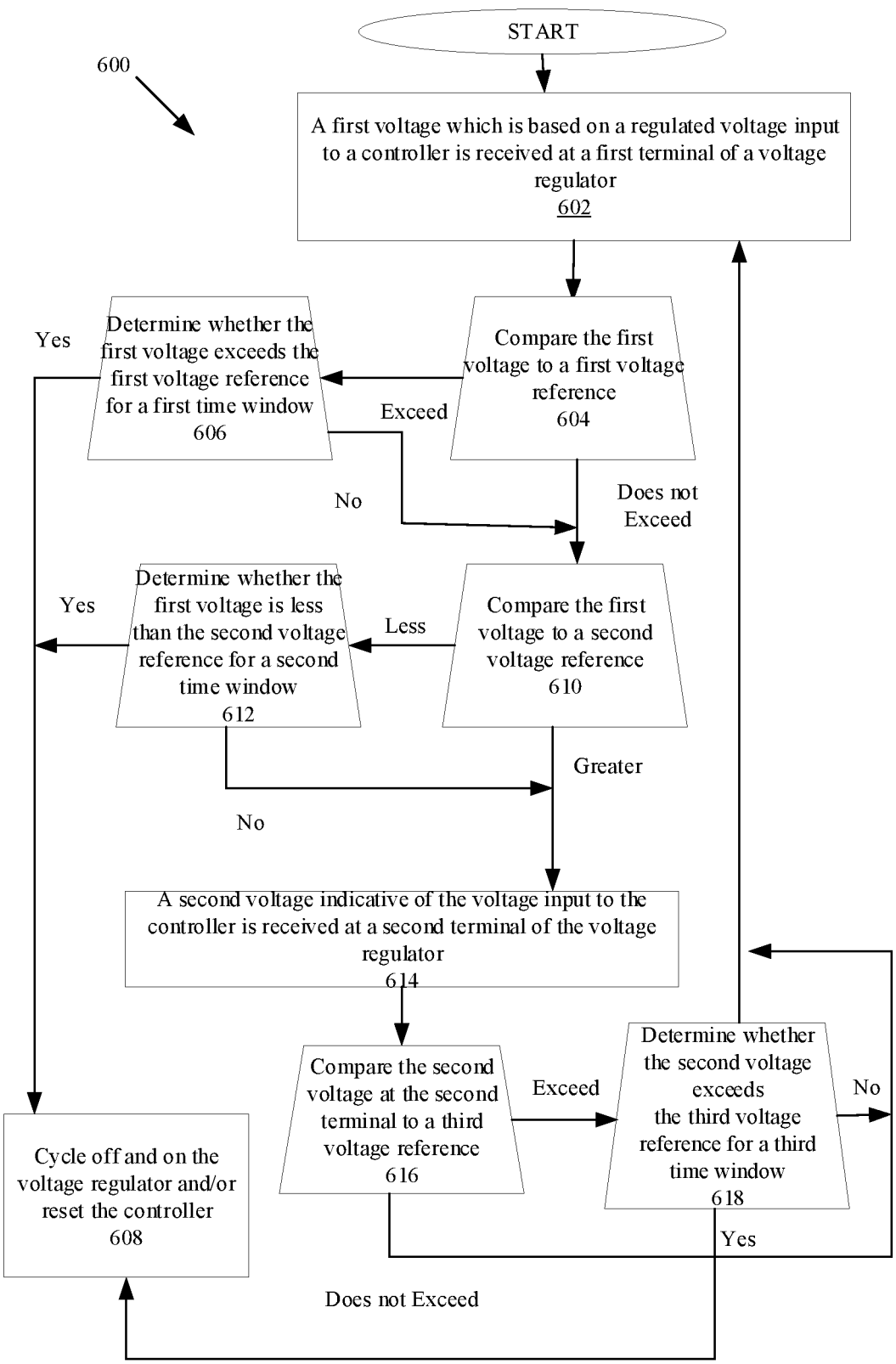
FIG. 6 is a flow chart of example functions associated with protecting a controller from over-voltage and under-voltage conditions in accordance with an embodiment.

FIG. 6 is a flow chart 600 of example functions associated with protecting a controller from over-voltage and under-voltage conditions in accordance with an embodiment. The functions may be performed by one or more of the voltage regulator 102, 402, 502, coupled to the controller 104 in the power control system 100, 400, 500, and in particular the state machine 146, 510 in an example embodiment.

At 602, a first voltage which is based on a regulated voltage input to a controller is received at a first terminal of a voltage regulator. The first voltage may be a sense voltage.

At 604, the first voltage may be compared to a first voltage reference. If the first voltage exceeds the first voltage reference, then at 606, a determination is made whether the first voltage exceeds the first voltage reference for a first time window. If the first voltage exceeds the first voltage reference for the first time window, then processing proceeds to 608 where the controller is reset as a result of an operating over-voltage condition. Additionally, the voltage regulator may be cycled off and on. If the first voltage does not exceed the first voltage reference for the first time window or the first voltage does not exceed the first voltage reference, then processing proceeds to 610.

At 610, the first voltage may be compared to a second voltage reference. The second voltage reference may have a different magnitude than the first reference voltage. If the first voltage is less than the second voltage reference, then at 612, a determination is made whether the first voltage is less than the second voltage reference for a second time window. If the first voltage is less than the second voltage reference for the second time window, then processing proceeds to 608 where the controller is reset as a result of an under-voltage condition. If the first voltage is not less than the second voltage reference for the second time window or the first voltage is not less than the second voltage reference, then processing proceeds to 614.

At 614, a second voltage indicative of the voltage input to the controller is received at a second terminal of the voltage regulator. In an example, the second terminal may be the over-voltage monitoring terminal 116. At 616, the second voltage at the second terminal may be compared to a third voltage reference. The third voltage reference may be a reference greater than the first reference voltage. The comparison may detect an absolute maximum over-voltage condition when the connection 124 between the feedback terminal 118 and the sense terminal 110 is disconnected, a wirebond or trace breaks in the controller, or a circuit malfunctions in the controller such that the sense terminal 110 does not receive the sense voltage. If the second voltage at the second terminal exceeds the third voltage reference, then at 618, a determination is made whether the second voltage at the second terminal exceeds the third voltage reference for a third time window. If the second voltage at the second terminal exceeds the third voltage reference for the third time window, then processing proceeds to 608 where the voltage regulator is cycled off and on as a result of an absolute maximum voltage condition. Additionally or alternatively, the controller may be reset. If the second voltage at the second terminal does not exceed the third voltage reference for the third time window or the second voltage at the second terminal does not exceed the third voltage reference, then processing proceeds to 602. In some examples, a counter of the voltage converter may count a number of times that the voltage regulator is cycled off and on. In the event that the voltage regulator is cycled a predetermined number of times, the voltage regulator may have a fault and be indefinitely powered down until it is serviced.

In one embodiment, a method to monitor for an over-voltage condition based on a regulated voltage is disclosed. The method comprises: receiving at a first terminal of a voltage regulator a first voltage which is based on a regulated voltage input to a controller; receiving at a second terminal of the voltage regulator a second voltage indicative of the voltage input to the controller; determining whether the first voltage exceeds the first voltage reference for a first time window; resetting the controller based on the determination that the first voltage exceeds the first voltage reference; determining whether the second voltage exceeds the second voltage reference for the second time window; and powering down the voltage regulator based on the determination that the second voltage exceeds the second voltage reference. In an embodiment, the first voltage reference is less than the second voltage reference. In an embodiment, the regulated voltage input to the controller generates a voltage input to a processor die of the controller, wherein the first voltage is the voltage input to the processor die of the controller. In an embodiment, the method further comprises receiving at a third terminal of the voltage regulator the first voltage and controlling the regulated voltage based on the first voltage. In an embodiment, resetting the controller based on the determination that the first voltage exceeds the first voltage reference further comprises powering down the voltage regulator. In an embodiment, the method further comprises resetting the voltage regulator based on the determination that the second voltage exceeds the second voltage reference. In an embodiment, the method further comprises incrementing a counter which counts a number of times that the voltage regulator is reset; and not powering up the voltage regulator until the voltage regulator is serviced when the counter exceeds a predetermined value. In an embodiment, the first time window is larger than the second time window. In an embodiment, the method further comprises selecting the first voltage or the second voltage and converting the selected voltage to a respective digital signal prior to the respective determinations.

In another embodiment, a power control system is disclosed. The power system comprises: a voltage regulator configured with a first terminal and a second terminal; a controller configured with a third terminal and a fourth terminal; wherein the first terminal is coupled to the third terminal and the second terminal is coupled to the fourth terminal; the voltage regulator configured to receive at a first terminal of a voltage regulator a first voltage which is based on a regulated voltage input to a controller; receive at a second terminal of the voltage regulator a second voltage indicative of the voltage input to the controller; determine whether the first voltage exceeds the first voltage reference; and determine whether the second voltage exceeds the second voltage reference; the voltage regulator further comprising: a state machine configured to determine that the first voltage exceeds the first voltage reference for a first time window; reset the controller based on the determination that the first voltage exceeds the first voltage reference; determine that the second voltage exceeds the second voltage reference for a second time window; and power down the voltage regulator based on the determination that the second voltage exceeds the second voltage reference. In an embodiment, the first voltage reference is less than the second voltage reference. In an embodiment, the regulated voltage input to the controller generates a voltage input to a processor die of the controller, wherein the first voltage is the voltage input to the processor die of the controller. In an embodiment, the voltage regulator further comprises a fifth terminal coupled to the fourth terminal; wherein the voltage regulator is further configured to receive at the fifth terminal of the voltage regulator the first voltage and control the regulated voltage based on the first voltage. In an embodiment, the state machine configured to reset the controller based on the determination that the first voltage exceeds the first voltage reference further comprises the state machine configured to power down the voltage regulator. In an embodiment, the state machine is further configured to reset the voltage regulator based on the determination that the second voltage exceeds the second voltage reference. In an embodiment, the voltage regulator is further configured to increment a counter which counts a number of times that the voltage regulator is reset; and not power up the voltage regulator until the voltage regulator is serviced when the counter exceeds a predetermined value. In an embodiment, the first time window is larger than the second time window. In an embodiment, the voltage converter further comprises a multiplexer to configured to select the first voltage or the second voltage and an analog-to-digital converter configured to convert the selected voltage to a respective digital signal prior to the respective determinations. In an embodiment, the voltage converter further comprises a first comparator configured to determine whether the first voltage exceeds the first voltage reference; and a second comparator configured to determine whether the second voltage exceeds the second voltage reference. In an embodiment, one or more of the first and second terminal are coupled to a resistor divider circuit.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

The invention claimed is:

1. A method to monitor for an over-voltage condition based on a regulated voltage, the method comprising:
receiving at a first terminal of a voltage regulator a first voltage which is based on a regulated voltage input to a controller;
receiving at a second terminal of the voltage regulator a second voltage indicative of the voltage input to the controller;
determining whether the first voltage exceeds a first voltage reference for a first time window;
resetting the controller based on the determination that the first voltage exceeds the first voltage reference;
determining whether the second voltage exceeds a second voltage reference for the second time window; and
powering down the voltage regulator based on the determination that the second voltage exceeds the second voltage reference; wherein resetting the controller based on the determination that the first voltage exceeds the first voltage reference further comprises powering down the voltage regulator.

2. The method of claim 1, wherein the first voltage reference is less than the second voltage reference.

3. The method of claim 1, wherein the regulated voltage input to the controller generates a voltage input to a processor die of the controller, wherein the first voltage is the voltage input to the processor die of the controller.

4. The method of claim 1, further comprising receiving at a third terminal of the voltage regulator the first voltage and controlling the regulated voltage based on the first voltage.

5. The method of claim 1, further comprising resetting the voltage regulator based on the determination that the second voltage exceeds the second voltage reference.

6. The method of claim 5, further comprising incrementing a counter which counts a number of times that the voltage regulator is reset; and not powering up the voltage regulator until the voltage regulator is serviced when the counter exceeds a predetermined value.

7. The method of claim 1, wherein the first time window is larger than the second time window.

8. The method of claim 1, further comprising selecting the first voltage or the second voltage and converting the selected voltage to a respective digital signal prior to the respective determinations.

9. A power control system comprising:
a voltage regulator configured with a first terminal and a second terminal;
a controller configured with a third terminal and a fourth terminal;
wherein the first terminal is coupled to the third terminal and the second terminal is coupled to the fourth terminal;
the voltage regulator configured to receive at a first terminal of a voltage regulator a first voltage which is based on a regulated voltage input to a controller; receive at a second terminal of the voltage regulator a second voltage indicative of the voltage input to the controller; determine whether the first voltage exceeds a first voltage reference; and determine whether the second voltage exceeds a second voltage reference;
the voltage regulator further comprising:
a state machine configured to determine that the first voltage exceeds the first voltage reference for a first time window; reset the controller based on the determination that the first voltage exceeds the first voltage reference; determine that the second voltage exceeds the second voltage reference for a second time window; and power down the voltage regulator based on the determination that the second voltage exceeds the second voltage reference; wherein the state machine configured to reset the controller based on the determination that the first voltage exceeds the first voltage reference further comprises the state machine configured to power down the voltage regulator.

10. The system of claim 9, wherein the first voltage reference is less than the second voltage reference.

11. The system of claim 9, wherein the regulated voltage input to the controller generates a voltage input to a processor die of the controller, wherein the first voltage is the voltage input to the processor die of the controller.

12. The system of claim 9, wherein the voltage regulator further comprises a fifth terminal coupled to the fourth terminal; wherein the voltage regulator is further configured to receive at the fifth terminal of the voltage regulator the first voltage and control the regulated voltage based on the first voltage.

13. The system of claim 9, wherein the state machine is further configured to reset the voltage regulator based on the determination that the second voltage exceeds the second voltage reference.

14. The system of claim 13, wherein the voltage regulator is further configured to increment a counter which counts a number of times that the voltage regulator is reset; and not power up the voltage regulator until the voltage regulator is serviced when the counter exceeds a predetermined value.

15. The system of claim 9, wherein the first time window is larger than the second time window.

16. The system of claim 9, wherein the voltage converter further comprises a multiplexer to configured to select the first voltage or the second voltage and an analog-to-digital converter configured to convert the selected voltage to a respective digital signal prior to the respective determinations.

17. The system of claim 9, wherein the voltage converter further comprises a first comparator configured to determine whether the first voltage exceeds the first voltage reference; and a second comparator configured to determine whether the second voltage exceeds the second voltage reference.

18. The system of claim 9, wherein one or more of the first and second terminal are coupled to a resistor divider circuit coupled to ground.

* * * * *